Oct. 31, 1961   J. R. PLATE ET AL   3,006,593
MULTIPLE POSITION SEAT
Filed March 11, 1957
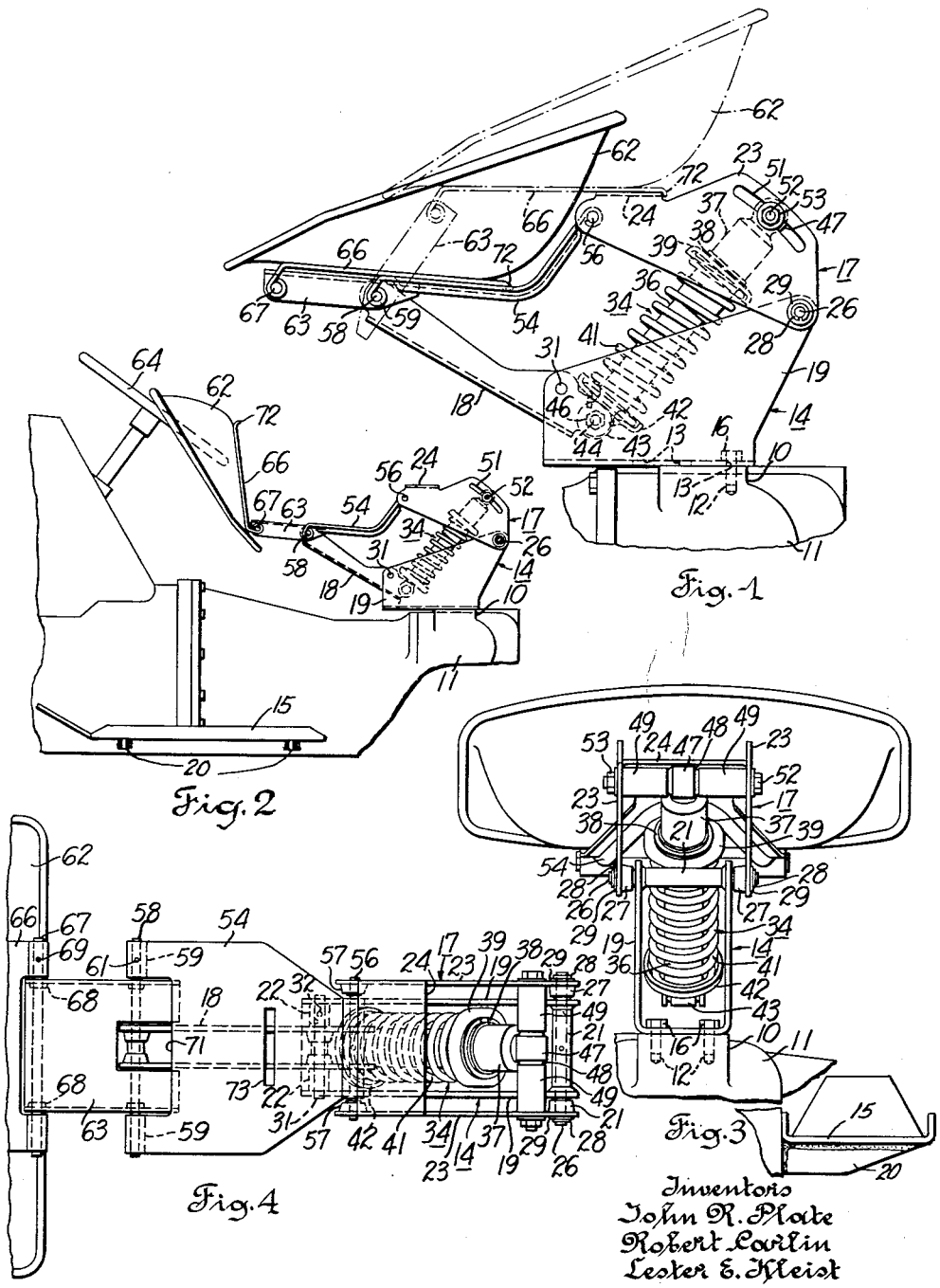

3,006,593
MULTIPLE POSITION SEAT
John R. Plate, Milwaukee, Robert Carlin, Greenfield, and Lester E. Kleist, Menomonee Falls, Wis., assignors to Allis-Chalmers Manufacturing Company, Milwaukee, Wis.
Filed Mar. 11, 1957, Ser. No. 645,321
2 Claims. (Cl. 248—376)

This invention relates to vehicle seats and more particularly to vehicle seats having a plurality of positions.

Many vehicles in operation today require the operator to stand so that he can more fully view the ground in front of the vehicle. Furthermore, these vehicles may be operated for long periods of time without stopping and it has been found that operator fatigue can be greatly reduced if the operator is allowed to stand and stretch his legs. It is, therefore, advisable not only to provide a comfortable seat, but one which can be adjusted to provide space for the operator to stand. This is particularly important to the operators of farm tractors since they operate the tractors for long periods and many of their operations, such as cultivating, require the operator to view the crop rows immediately in front of the tractor.

Tractors have been designed in the past which provided an operator's station having a platform on which the operator could stand. In several of these prior art structures the operator stood to one side of the seat or the seat pivoted to one side permitting him to stand. However, as tractor development advanced space available on the tractor was used for functional apparatus necessary to the tractor's operation and standing room in many instances was not provided.

The next step in the prior art was to provide a seat which could be moved from its normal sitting position to a rearward position which allowed space for the operator to stand. An example of such a seat is shown in U.S. Patent 2,692,008 issued to H. G. Klemm. The seat shown in the Klemm patent can be retracted by raising the rear portion of the seat pan which results in the forward edge of the pan being moved rearward. In this position the operator can stand with his legs straddling the spring support bar.

All too frequently situations develop while the tractor is being operated which require the operator to use not only his hands but also and at the same time both feet. In presently known seat arrangements when the seat is adjusted to provide standing room it is impossible for the operator to immediately sit on the seat and use both hands and feet at the same time. If the seat has been moved completely out of the way he cannot lean on the seat and in an emergency if the operator forgets and attempts to sit he is quite likely to lose control of the tractor and injure himself. In structures such as shown in the Klemm patent if the operator attempts to sit down with the seat in its retracted position the pan is liable to slip forward. If the pan is locked in the retracted position it would still be impossible for the operator to use both feet because of the downward inclination of the pan which would require the operator to keep one foot on the tractor to brace himself.

With the foregoing in mind it is a general object of the invention to provide a tractor seat which is simple in construction and inexpensive to manufacture and which overcomes the shortcomings of previously known tractor seats.

Another object is to provide a tractor seat which is easily movable to a retracted position allowing standing room for the tractor operator in front of the seat.

A further object is to provide a retractable seat wherein the seat pan retains a substantially horizontal position in both its normal and retracted positions.

A further object is to provide a tractor seat of the hereinbefore mentioned type wherein the seat may be sat upon in its retracted position.

Another object is to provide a tractor seat which can be partially inverted thereby protecting the seat pan from foreign matter when the tractor is not in use.

The foregoing and other objects and advantages of the invention will become more fully apparent from the following description of the embodiment shown in the accompanying drawings. Referring to the drawings in which like reference characters designate the same or similar parts in the various views:

FIG. 1 is a side view of the seat assembly;
FIG. 2 is a side view of the seat assembly shown attached to the tractor;
FIG. 3 is a rear view of the seat assembly; and
FIG. 4 is a top view of the seat assembly.

Referring now to the embodiment of the invention shown in FIGS. 1 to 4, inclusive, it will be noted that a mounting pad 10 formed on a tractor housing 11 has two threaded bolt holes 12 therein which are selectively alignable with any one of three sets of holes 13 drilled in a mounting bracket 14. Bolts 16 securely fasten the mounting bracket 14 to the pad 10. This arrangement allows the mounting bracket to be adjusted longitudinally of the tractor in any one of three positions depending on the requirements of the tractor operator. An operator's standing platform 15 is rigidly attached to the tractor body below and immediately forward of the mounting bracket 14 by braces 20. Tractor standing platforms are known in the art as is shown by U.S. Patent 2,247,668 issued to W. C. Rosenthal, July 1, 1941.

An upper arm 17 is pivotally connected to the rearward portion of bracket 14 and a lower arm 18 is pivotally connected to a forward portion of bracket 14. The arms 17 and 18 are spaced vertically from one another and extend forward in substantially parallel relation. An exact parallel relationship is not used so that the lower arm does not descend as rapidly as the upper arm. With this arrangement the forward end of an operator's seat pan (to be described later) is tilted slightly upward as the arms are depressed resulting in the operator more securely retaining his position in the pan when uneven ground surfaces are traversed.

The mounting bracket 14 is U-shaped with the bottom or base of the U attached to the mounting pad 10. Identically shaped laterally spaced legs 19 extend vertically upward from the base with the forward portion of the legs terminating at a lower level than the rearward portion. A bushing 21 has opposite ends welded to the legs 19 between aligned holes drilled in the legs 19 at their upper and rearwardmost portions. On the inside surfaces of the lower and forwardmost portions of the legs 19 are welded a pair of aligned bosses 22. Holes drilled through the bosses 22 form bearing surfaces for the pivotal connection between the lower arm 18 and bracket 14.

Upper arm 17 is composed of two identically shaped laterally spaced and aligned side walls 23. These side walls are integrally joined at their top forward edges by a flat crosspiece 24. The pivotal connection between the rearward end of upper arm 17 and the rearward or upper portion of the mounting bracket 14 is effected by passing a pin 26 through aligned holes in the legs 19 and through the bushing 21 welded to the bracket 14. The holes extend through bosses 27 welded to the inside surfaces of side walls 23 of the upper arm 17. The bosses 27 not only provide bearing surface for the pin 26 but act as spacers between the side walls 23 and legs 19 of the mounting bracket 14. The pin 26 is held in place by snap rings 28 inserted in grooves formed on the periphery of the pin at each end thereof. The snap rings bear against washers 29 placed on the pin 26 between the snap rings 28 and side walls 23 of the arm 17 and restrain the side walls from spreading outward.

Lower arm 18 oblong and generally channel shaped in cross section is journaled on a pin 31 which passes through the bosses 22 and is held from rotation therein by a dowel pin 32. The bosses 22 bear against the lower arm 18 and restrain it from lateral movement. The rearward end of arm 18 extends to the rear of pin 31 and moves upward as the forward portion of arm 18 moves downward.

A concentric spring and shock absorber assembly 34 is pivotally connected to the upper arm 17 and the rearward end of arm 18. The lower portion of the assembly is positioned between the legs 19 of the bracket 14 and the upper end of the assembly is positioned between the side walls 23 of the upper arm 17. With this arrangement of parts the structure is not only compact but a large portion of the assembly 34 is protected from damage. Furthermore, because of the lateral spacing of the legs 19 and side walls 23 a rigid construction is effected and lateral movement of the arms 17 and 18 is negligible.

The assembly 34 is composed of a standard hydraulic cylinder 36, a piston and piston rod (not shown) and a cap 37 integral with the protruding end of the piston rod. The cap 37 has a flange 38 formed on its lower edge and this flange abuts against a spring retainer 39 which is acted upon by the upper end of a coil spring 41. The lower end of spring 41 is held in place by another spring retainer 42 which abuts against an eye bracket 43 welded to the lower end of the cylinder 36.

The eye bracket 43 fits into the open channel section of the rearward portion of arm 18 and is pivoted on a bolt 44 which extends through the sides of the lower arm. The bolt 44 is held in place by a nut 46.

Another eye bracket 47 is welded to the top of cap 37. A tubular shaped rubber bushing 48 having tapered ends is pressed into eye bracket 47 with the tapered ends protruding on either side of the eye. Spacer sleeves 49 each receive a tapered end of the rubber bushing 48 in their corresponding inner ends and have their corresponding outer ends abutting the side walls 23 of the upper arm 17 in alignment with slots 51 cut in the side walls 23. A bolt 52 passes through the slots 51, bushing 48 and sleeves 49 and is held in place by a nut 53.

With this arrangement of parts an adjustable pivotal connection is provided between the spring and shock absorber assembly 34 and upper arm 17. When the nut 53 is tightened the bolt 52 is rigid with the side walls 23, however, due to the rubber bushing 48 pivoting of the eye bracket 47 relative to the bolt 52 is possible. By loosening the nut 53 the assembly 34 can be moved toward a vertical position and further from the pin 26, thereby increasing its effectiveness in resisting loads imposed on the arms 17 and 18.

A generally L-shaped load supporting member 54 pivotally connects corresponding forward end portions of arms 17 and 18. A laterally disposed pin 56 rigid with the rearward end of member 54 is journaled in bearings 57 formed on the forward end of arm 17. The lower arm 18 is journaled on another pin 58 which extends laterally on either side of the arm 18 and is held within bushings 59 welded to the forward end of the load supporting member 54. A dowel pin 61 restrains the pin from lateral movement and rotation relative to the member 54.

The cushioning mechanism or support described above is operative independently of any further structure and can be used to support a variety of different types of loads. In the exemplary showing it has been combined with a seat pan 62 to form a novel seat structure for farm tractors.

Because of a floating link 63 and its novel connection with the support and the seat pan 62 the seat pan can easily be located in three different positions depending on the particular requirements of the tractor operator. From its first or normal operating position (shown in full lines in FIG. 1) the seat pan can be moved to its second or retracted position (shown in phantom lines in FIG. 1) providing ample room for the operator to stand on the platform 15 between the front of the seat pan and the tractor steering wheel 64. It should be noted that in both the normal and retracted positions the tractor operator can sit in the seat pan. These positions in which the operator may sit in the seat pan can be referred to as operative positions. In most instances the operator will sit in the pan while it occupies its normal position, however, in emergencies and in the case of extremely tall operators the seat pan can be occupied with complete safety in its retracted position. The third or inoperative position shown in FIG. 2 is provided to protect the seat pan from rain or snow when the tractor is not in use.

The three seat positions are attainable in this invention by providing a double pivot connection between the support and the forward edge of the seat pan 62. As shown in FIG. 4 the rear portion of link 63 is journaled on pin 58 and the front end of the link is pivoted to a bracket 66 which is rigidly attached in any conventional manner to the underside of the seat pan 62. The front pivot connection is composed of a pin 67 which is rigid with the front end of bracket 66 and which passes through suitable bearings 68 formed on the front end of link 63. The pin is held from lateral displacement and made rigid with bracket 66 by a dowel pin 69. The forward end of bracket 66 is bent downward and has its center portion cut away to provide sufficient clearance for the seat pan to be rotated relative to the link 63.

The pivot connection between the member 54 and link 63 is provided with two stops to insure link 63 with only the required amount of rotation. It will be noted that the front end of member 54 is bent downward placing the pin 58 on a lower plane than the forward portion of member 54 and allowing the rearward end of link 63 to extend beneath member 54. When the seat pan 62 is in its normal position the rearward end of link 63 contacts the under surface of member 54 and restrains the link from further counterclockwise rotation. By restraining the link from downward rotation beyond a substantially horizontal position the forward portion of the seat pan can rest on the link without tipping forward. Furthermore, because of the proximity of the front pivot connection to the front edge of the seat pan it is all but impossible to tilt the seat pan forward about its pivot with link 63 by downward pressure on the forward edge of the seat.

From its generally horizontal position link 63 can be rotated clockwise about pin 58 until it strikes a second stop formed by the surface 71 of member 54. The center forward portion of member 54 is relieved a sufficient amount to provide clearance for link 63 and surface 71 is spaced rearward of pin 58 a sufficient distance so that when link 63 contacts the surface it assumes a generally upward and rearward direction. In accordance with the invention link 63 is long enough so that when it is in contact with surface 71 the pivot connection between link 63 and bracket 66 is on a substantially equal level with the level of crosspiece 24. With the rearward portion of seat pan 62 resting on the crosspiece 24 it can be seen that the seat pan also occupies a horizontal operative position in its retracted position and can be sat upon by the operator. By allowing link 63 to rotate beyond a vertical position and bear against surface 71 the seat structure will not collapse as a result of the operator's weight. Here again because of the close proximity of the pivot connection between the link 63 and bracket 66 and the front edge of the seat pan the operator may lean against the seat pan or sit on its forward edge without danger of it tilting forward.

Although it is unlikely that the seat pan would slide forward off of crosspiece 24 to insure its retaining this position a lip 72 has been formed by bending the rear edge of bracket 66 downward. In the retracted position this lip hooks around the rear edge of crosspiece 24 and holds the seat pan 62 from sliding forward. In order to allow the seat pan to rest flat on the member 54 a slot 73 has been cut in the member 54 and this slot receives the lip 72 when the seat pan is in its normal position.

It should be noted that in the normal position shown in solid lines in FIG. 1 that the front edge of the seat pan extends beyond the forward end of the seat support or lower arm 18. In its retracted position the front edge of the seat pan is above and substantially in line with the front end of the lower arm 18. In this manner, in the retracted position the operator is not required to straddle any portion of the support when standing on the platform in front of the seat pan.

By way of summary the hereinbefore described seat supporting structure, which is disposed vertically between the operator's platform 15 and the steering wheel 64, includes a pair of parallel arms 17, 18 which are spring biased by spring 41 and project forwardly from pivots 31 and 26. A load supporting member 54 has its forward end pivotally connected to arm 18 by pivot means including pin 58 for rotative movement about the axis of pin 58. The rearward end of member 54 is pivotally connected to arm 17 by pivot means including pin 56 for pivotal movement about the axis of pin 56. In the illustrated embodiment of the invention a link 63 is pivotally connected to the pin 58 for rotation about the axis of the pin 58 between a forward pivoted position as shown in solid lines in FIG. 1 of the drawings. In this position the free end of the link 63 projects rearwardly beyond the pivot pin 58 and constitutes an abutment which cooperates with a complementary abutment formed by the underside of member 54. The link 63 is pivotable upwardly and rearwardly to the position shown in phantom wherein the transversely extending surface of link 63 abuts against surface 71 of member 54. The portion of the link 63 abutting the surface 71 and the surface 71 constitute a second pair of cooperating abutments. When the link 63 is rotated forwardly, it forms a forward extension of member 54 and pivotally supports the forward end of the seat 62 through a pivot connection including pin 67. The member 54 supports the rear portion of seat 62 when it is in the first seating position as shown in solid lines in FIG. 1. The seat has a second seating position shown in phantom in FIG. 1 wherein the forward end of the seat 62 is supported by the link 63 and the rearward end of seat 62 is supported on the arms 17 of the seat supporting structure. When the link is pivoted forwardly to form an extension of member 54 the seat 62 may be pivoted forwardly about the first pivot axis to a third, inoperative position wherein the seat rests against the steering wheel 64. The member 54 has a seat supporting portion extending horizontally rearward from the axis of pin 58 and an upwardly extending portion between the seat supporting portion and the axis of pin 56. This combination of components provides a cushion seat support having three positions for the seat 62; the first position being the normal operating position and the second position being an alternate position wherein the seat is retracted rearwardly and upwardly so that the operator may stand on platform 15 and steer the tractor to reduce operator's fatigue and may quickly seat himself to operate tractor controls without changing the seat position. The seat 62 is movable to a third position which is not a seating position wherein the seat 62 is leaning against the steering wheel 64. In the third position the seat does not collect rain, snow, etc.

The third or semiinverted position of the seat pan is attained by tilting the pan forward from its normal position about pin 67 until it rests against the tractor steering wheel 64. This position cannot be reached while the operator is on the tractor and, therefore, insures the seat of being in an operative position whenever the tractor is being operated. This eliminates the possibility of the seat pan being in any but a sitting position while the tractor is being operated and should an emergency arise while the operator is standing he can sit back without having to worry about whether or not there is a seat pan beneath him. A further convenience of having the seat pan rest against the steering wheel lies in the fact that it can easily be put in the normal or retracted position while the operator is mounting the tractor and does not require him to go to the rear of the tractor to put the seat in an operative position.

It should be noted that while applicants have provided a seat structure wherein the seat pan can be located in three different positions, in no instance is the pan locked in position. Because of the novel arrangement of the stops in relation to link 63 the pan can be safely used in either its normal or retracted positions but is also freely movable to another position without the necessity of releasing any type of fastener.

It should be understood that it is not intended to limit the invention to the exact details of construction herein described with reference to the drawings, and it is intended to include such other forms and modifications as are embraced by the appended claims.

What is claimed is:

1. In combination with a tractor of the type having an operator's standing platform spaced below the steering wheel and a seat supporting structure disposed vertically between said platform and steering wheel including a pair of spring biased, forwardly projecting, substantially parallel arms, the combination comprising: a load supporting member; first pivot means connecting the forward end of said member to one of said arms for rotation about a first transverse axis; second pivot means connecting said member to the other of said arms for rotation about a second axis parallel to said first axis; a link pivotally connected to said structure for forward and rearward vertical swinging movement; a seat pivotally connected to said link on a third axis in parallel spaced relation to the pivot connection between said link and said structure; a first pair of cooperating abutments on said link and member, respectively, for limiting swinging movement of said link forwardly at a point in which it forms a forward extension of said member and supports the forward part of said seat in a first operator seating position, the rear portion of said seat being supported on said member in said first position; a second pair of cooperating abutments on said link and member, respectively, limiting swinging movement of said link rearwardly at a point at which said link extends upwardly and rearwardly and supports the forward part of said seat in a second operator's seating position of higher elevation than said first position, said seat being retracted rearwardly in said second position sufficiently to permit the operator to stand on said platform; and a seat supporting part formed on said structure for supporting the rearward part of said seat in its second position at an elevation above its first position, said seat being swingable forward about said third axis to a third position in which it rests against said steering wheel when said link is pivoted forwardly to form an extension of said member.

2. The structure set forth in claim 1 wherein said second axis is disposed vertically above said first axis and said member includes a seat supporting portion extending horizontally rearward from said first axis and an upwardly extending portion between said first portion and said second axis.

References Cited in the file of this patent

UNITED STATES PATENTS

| | | |
|---|---|---|
| 151,898 | Meigs | June 9, 1874 |
| 418,747 | Prather | Jan. 7, 1890 |
| 709,619 | Wangerin | Sept. 23, 1902 |
| 1,427,280 | Gahm | Aug. 29, 1922 |
| 2,598,384 | Huber | May 27, 1952 |
| 2,692,008 | Klemm | Oct. 19, 1954 |

FOREIGN PATENTS

| | | |
|---|---|---|
| 349,867 | Great Britain | June 4, 1931 |
| 966,351 | France | Mar. 1, 1950 |